INVENTOR.
ARTHUR F. HUDSON
by JEFFERS & YOUNG
ATTORNEYS

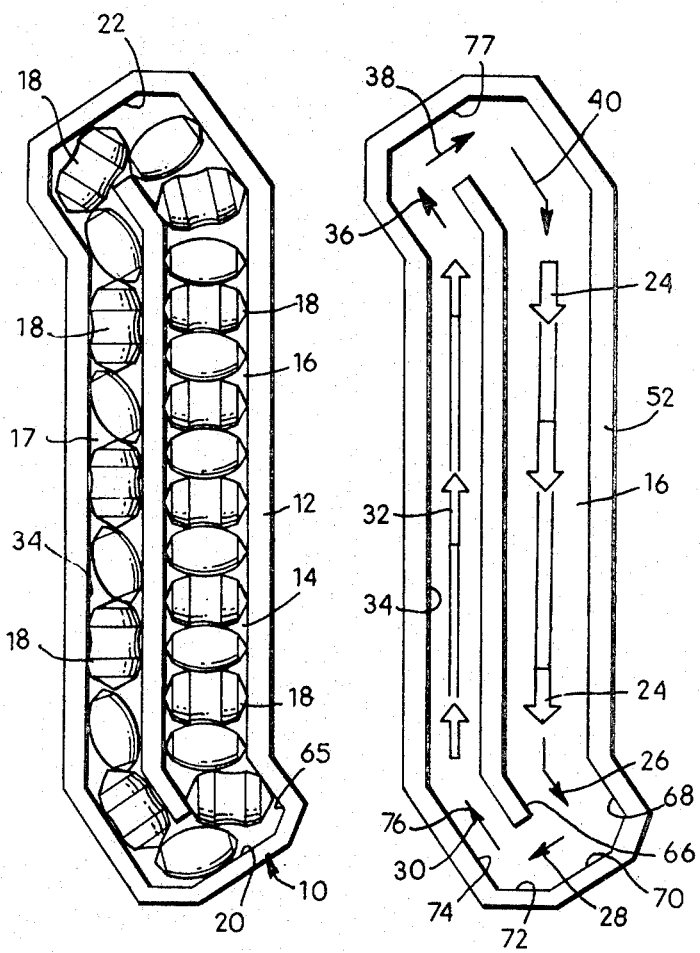

United States Patent Office 3,466,101
Patented Sept. 9, 1969

3,466,101
BEARING
Arthur F. Hudson, P.O. Box 630,
Huntington, Ind. 46750
Filed Oct. 23, 1965, Ser. No. 502,824
Int. Cl. F16c 19/56, 21/00, 17/26
U.S. Cl. 308—6
4 Claims

ABSTRACT OF THE DISCLOSURE

This invention concerns an improved bearing in which the bearing elements are of dumbbell configuration and are separated by rotatable spacer bearing elements engageable with and spacing the dumbbell bearing elements apart by the proper clearance, all of the bearing elements being circulated in a raceway, a portion of the raceway being located with the bearings in supported position and the remainder of the raceway forming the closed loop path by which the individual bearing elements are continuously circulated.

---

This invention relates to an improved bearing and more particularly to a bearing construction which is capable of supporting increased bearing loads without appreciable deformation either to the bearing elements or to their opposed supporting surfaces.

Ball bearing elements which are mounted within raceways of flat configuration are in point contact therewith and under high normal forces the unit loading of such bearings tends to produce distortion both of the ball bearing element and of the opposed seat. The art has endeavored to overcome this difficulty by producing raceways of convex shape which receive the balls by increasing the point contact to a line contact. It is possible to reduce the unit loading on the bearing and hence reduce the incidence of deformation on the bearing. It has been found, however, that this expedient is not satisfactory because of the difficulty of adjusting the bearing to compensate for wear and also because of the difficulty in obtaining accurate seating of the bearing within the opposed raceways.

The present invention proposes to overcome these previous deficiencies by providing a unique bearing element construction having linear bearing surfaces which are better capable of sustaining high orders of normal loads while at the same time utilizing a race way of simplified construction. By utilizing line contact for the bearing elements, as distinguished from point contact, the bearing elements are not only prone to last longer but also are less likely to produce damage to the opposing raceway wherein the bearings are mounted.

An important feature of the present invention is that of providing a closed loop raceway wherein the bearing elements circulate endlessly in a closed loop and including a unique arrangement of cams and bearing elements which effect necessary positioning of the bearing elements so that each is in proper working position for supporting load or for moving along a return path for recirculation.

The present invention further proposes to minimize the tendency for excessive wear of the bearing elements because of their scuffing or rubbing at the point of tangency. Such deficiency is overcome in the present invention by interposing idler elements between adjacent ones of the functional bearing elements and which produce rolling contact between adjacent members as distinguished from the rubbing engagement previously encountered in the prior art.

It is a further important feature of the present invention that the raceways or cage portions of the bearing can be replaced as they are worn and the dimension of such raceway sections which provide the surfaces of engagement for the bearing, can be varied in order to take up clearance and thereby adjust for wear which occurs in the system.

It is also an important feature of the present invention that the bearings and idler elements have coacting engageable surfaces which, as they move endlessly around the track, cause the elements to cam or position each other to suitable attitudes necessary for effecting circulation endlessly around the track.

Other objects and features of the present invention will become apparent from a consideration of the following description which proceeds with reference to the accompanying drawings, wherein:

FIGURE 1 is a schematic section view taken longitudinally through a bearing race on the line 1—1 of FIGURE 3, and showing the bearing elements and intermediate idlers;

FIGURE 2 illustrates the raceway of FIGURE 1 with the bearing elements shown removed and including arrows to illustrate the circulation path of the bearings and bearing elements;

Figure 5:
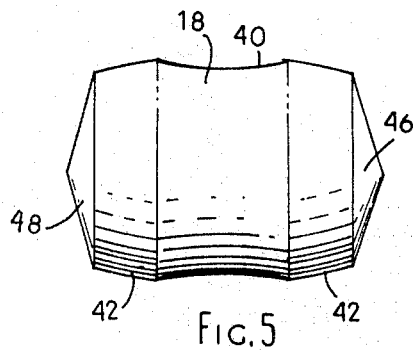
FIGURE 5 is an enlarged view of the bearing element.
Figure 6:
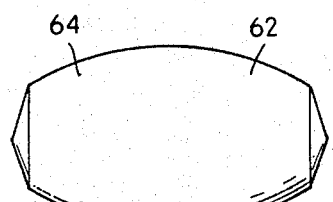
FIGURE 6 is an enlarged detailed view of the idler element which separates adjacent bearing elements.
Figure 3:
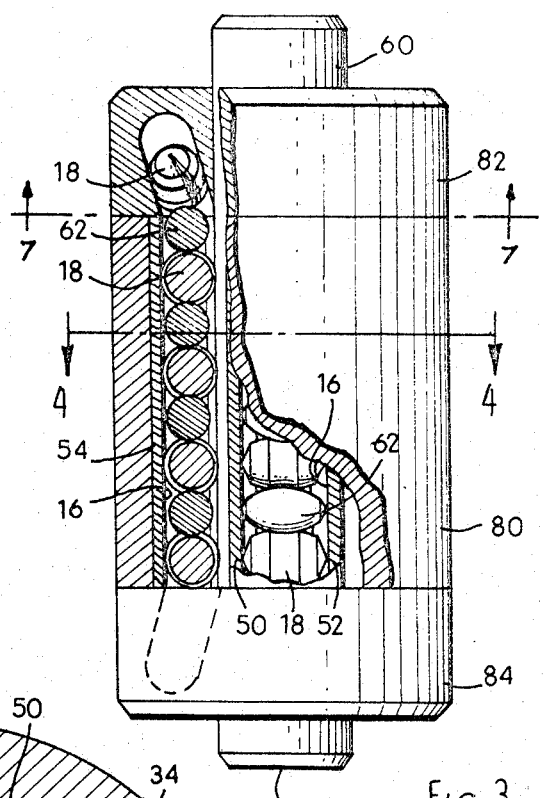
FIGURE 3 illustrates the bearing in operative position, with portions of the relatively movable members broken away to illustrate the operative position for the bearing, bearing elements, idler elements and return path for these parts.

Referring now to the drawings, the bearing designated generally by reference numeral 10 includes a raceway 12 with a track 14 formed in a closed endless loop with a vertical section 16 wherein bearing elements 18 are in thrust-receiving positions and a return section 19 wherein the bearing elements are in nonoperative position. The two track sections are connected by turnaround, camming surfaces 20 and 22 wherein the bearing elements change direction and position as shown in FIGURE 2. Within section 16 the bearing elements move downwardly in the direction of the arrows 24, and are then inclined in their direction of movement, as indicated by arrow 26, reverse direction as shown by arrow 28 and then arrow 30 and then travel upwardly as indicated by arrow 32 in section 34 at the top of which the bearings again change direction and attitude as illustrated by arrows 36, 38 and 39.

Each bearing element, referring to FIGURE 5, has a central recess 40 which provides a concavely shaped bearing surface and two end bearing surfaces 42 which form convex bearing surfaces. The conical end sections 46 and 48 are configured so that they will lightly engage and be retained by complementary surfaces 50 and 52 of bearing cage 54. The bearing elements are thus permitted to move within the cage 54 as indicated in FIGURE 2 but are prevented from moving out of their functional positions.

Figure 4:
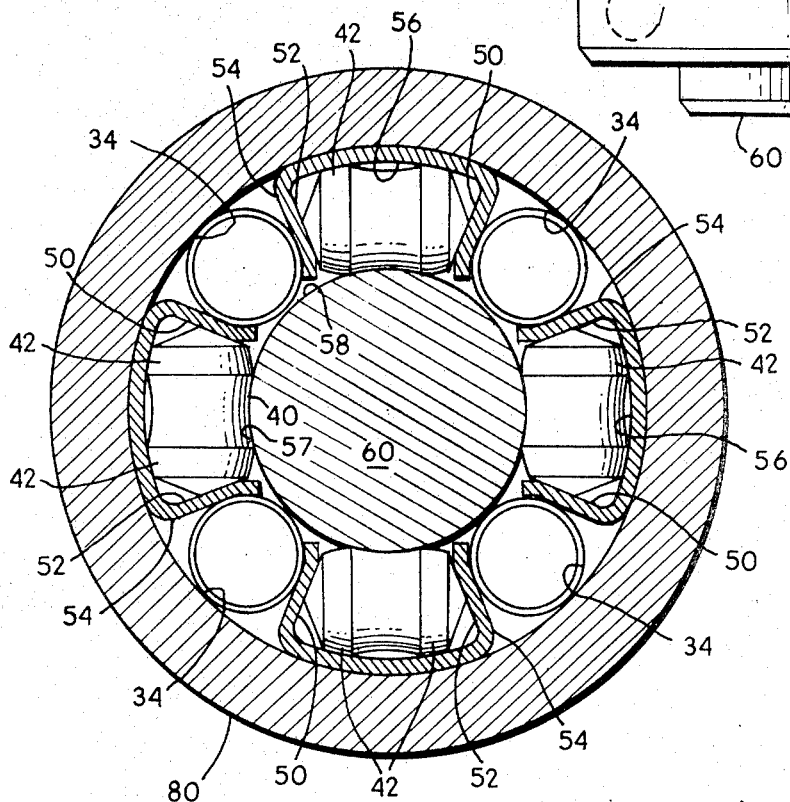
FIGURE 4 is a section view taken on line 4—4 of FIGURE 3.
Figure 7:
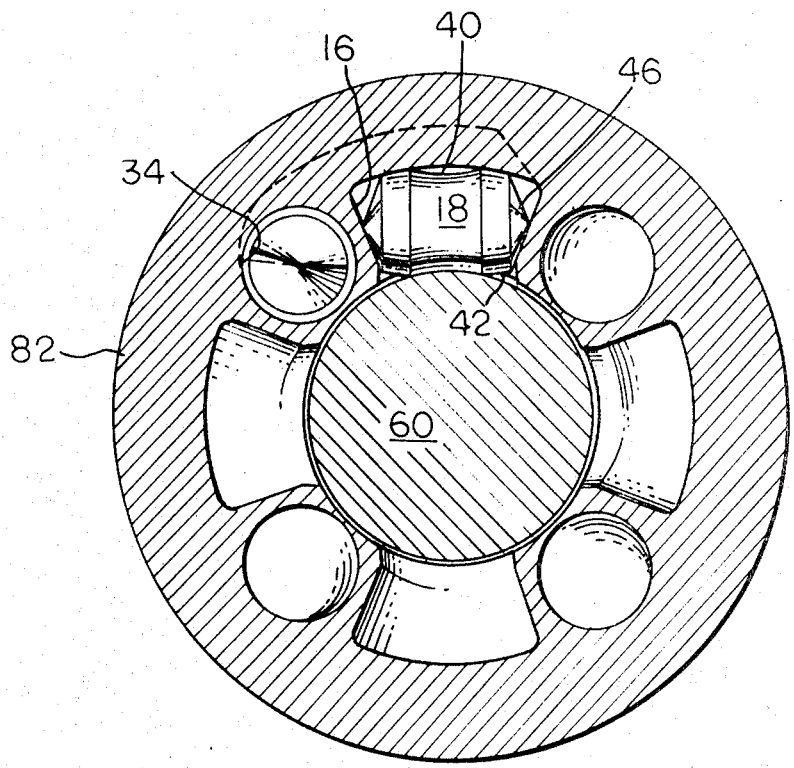
FIGURE 7 is a sectional view taken on line 7—7 of FIGURE 3.

As shown in FIGURE 4, the convexly shaped sections 42 engage surface 56 of the cage 54 and form a linear bearing surface of engagement therewith. Still referring to FIGURE 4, the central recess 40 provides a surface of engagement 56 with the outer surface 58 of shaft 60 which is thereby supported through rolling engagement with surfaces of the rotatable bearing elements 18. Between each rotatable bearing element is an idler 62 having a convexly shaped outer surface 64 which is received within central recess 40 and is in rolling engagement therewith.

The force tending to move the bearing elements and idlers in the direction of the arrows of FIGURE 2 causes the bearings to circulate endlessly through sections 16 and 34 and adjacent bearings and idlers are in rolling engagement with each other to reduce friction and wear. In previous embodiments adjacent bearing elements were rotated in the same direction and hence were in rubbing engagement with each other, thus contributing to added friction and wear; but in the present invention, the bearings and intermediate idlers rotate in opposite directions. Thus the bearings all rotate in the same direction and the intermediate idlers each rotate in an opposite direction to the contiguous bearing, consequently there are no rubbing surfaces in the bearing as a whole so that the shaft 60 can move more effortlessly and the wear within the bearing is substantially reduced.

As the bearing elements 18 move downwardly within section 14 and reach section 64, the tapered conical ends engage surfaces 66, 68 (FIGURE 2) causing them to move in the direction of the arrow 26 and the idler roller next above the lowermost roller bearing element (FIGURE 1) as it is moved downwardly, translates the bearing along surface 70, while at the same time inclining the longitudinal axis of the bearing in the direction of the arrow 28. As the tapered end of the bearing then engages surface 72 the advancing idler roller, as it moves along surface 70, pushes the rotatable bearing element upwardly along surface 74 and inclines its axis of rotation in the direction of the arrow 76. As the bearing element then enters section 34 its attitude is again changed to be substantially parallel to the direction of the arrow 34 (FIGURE 2) and travels upwardly until reaching the upper section of the cage where it is then cammed around and then starts its downward travel with the axis of rotation transversely to the direction of the arrow 24 (FIGURE 2). As the bearing element and idler 64 move with the described closed loop movement they are maintained in proper position either by the arms 50, 52 (FIGURE 4) as they move downwardly or by the circular cross-section passageway 34 (FIGURE 4) as they move upwardly during the time they are in nonload-sustaining position.

In operation the shaft 60 can move freely and substantially effortlessly, being supported on the rotatable bearing elements 18 through linear contact therewith and such linear engagement reduces the unit loading and therefore increases the capacity of the bearing. The bearing support is provided at as any different peripheral points as the design may require. Referring to FIGURE 4, there are four sets of bearings spaced equidistantly around the periphery of the shaft 60 and this number can be three, four, five, etc. depending upon the design requirements. Because of the linear engagement of the bearing with shaft 60, not only is the shaft 60 more positively guided and with greater capacity but also the tendency to wear grooves or tracks within the shaft 60 is proportionately decreased. The bearing load is transferred through the bearing elements onto the interior surface 56 (FIGURE 4) through surfaces 42 of the bearing elements which have linear contact with surface 56. Such linear contact again decreases the unit loading and thereby increases the capacity of the bearing and also reduces bearing wear.

When wear does occur in the bearing the cages 54 can be removed and replaced, thereby taking up whatever wear has occurred on the faces of the bearing elements. In this way a close, accurate tolerance can be maintained which will prevent a loose play of the shaft 60 within its bearing support.

As a consequence of the foregoing structure it is possible to provide a bearing support of substantial capacity and which is of light weight, durable and of inexpensive construction. Furthermore, because of the high capacity of the bearing elements it is possible to minimize variation in size of the bearing elements and provide instead simply a greater number of bearing elements spaced around the periphery of the structure to be supported. For example, referring to FIGURE 4, if needed the number of bearing elements can be increased or decreased around the periphery of a shaft or other member being mounted and supported for rotatable movement.

While the present invention has been illustrated and described in connection with a single example embodiment it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

I claim:

1. An improved bearing construction comprising: a plurality of roller bearing elements, in working side-to-side positions each having an arcuate recess at the central portion thereof providing a linear engagement surface and two spaced bearing surfaces one at each side of said recess and each providing linear bearing surfaces resisting the bearing forces generated at said recess, a plurality of spaced idlers between and separating said bearing elements, means forming a track guiding the longitudinal movement of said bearing elements, cage means constraining said bearing elements, means relocating said bearing elements from their working positions to end-to-end positions for recirculation, and return means connecting the opposite ends of said track to define a closed loop in which said roller bearing elements are passed rotatably through the bearing-providing section of said track and are recirculated in such end-to-end position in a closed endless loop movement around said track.

2. A bearing construction, comprising: a track, a plurality of roller bearing elements adapted for turning movement within said track which is proportioned to receive said rotatable bearing elements as they are disposed with their lengths extending transversely to said track, a recirculating track section connecting the opposite ends of said first mentioned track section and including camming means changing the position of said roller bearing elements so that they move rotatably through one track section and endwise through the other track section, said camming means locating said bearings in their respective positions as they are circulated continuously through said different sections at their respective longitudinal and transverse positions.

3. The bearing construction in accordance with claim 2 including: change-direction camming means controlling the operative positions of said camming elements in their respective sections.

4. An improved bearing construction comprising: a plurality of roller bearing elements in working side-by-side positions and each having an arcuate recess at the central portion thereof providing a linear engagement surface and two spaced bearing surfaces one at each side of said recess and each providing linear bearing surfaces resisting bearing reaction guide surface means and adjustable to compensate for wear of said bearing elements, said guide surface means forming a track guiding the longitudinal movement of said bearing elements, idler means separating said bearing elements and movable therewith through said track, cage means constraining said bearing elements, mean relocating said bearing elements from their working positions to end-to-end positions for return movement, and return means connecting the opposite ends of said track to define a closed loop whereby said roller bearing elements are passed rotatably through the bearing-providing section of said track and are then recirculated in a closed endless loop movement around said track.

References Cited
UNITED STATES PATENTS

| | | | |
|---|---|---|---|
| 928,800 | 7/1909 | Schilling | 308—206 |
| 1,160,293 | 11/1915 | Lorson | 308—206 |
| 1,982,899 | 12/1934 | Buckwalter | 308—214 |
| 2,221,513 | 11/1940 | Foley | 308—206 |
| 2,304,291 | 12/1942 | Wahlberg. | |
| 2,973,671 | 3/1961 | Elkins. | |
| 3,003,828 | 10/1961 | Stark. | |
| 3,210,136 | 10/1965 | Anderson. | |
| 3,404,133 | 2/1967 | Strassberg. | |
| 1,973,994 | 9/1934 | Peterson | 308—187.1 X |
| 3,353,876 | 11/1967 | Moyer. | |
| 3,357,713 | 12/1967 | Ionov. | |

FOREIGN PATENTS

| | | |
|---|---|---|
| 1,107,085 | 4/1902 | France. |
| 853,684 | 7/1942 | Germany. |
| 1,193,830 | 11/1959 | France. |

MARTIN P. SCHWADRON, Primary Examiner

L. L. JOHNSON, Assistant Examiner

UNITED STATES PATENT OFFICE
CERTIFICATE OF CORRECTION

Patent No. 3,466,101                                          September 9, 1969

Arthur F. Hudson

It is certified that error appears in the above identified patent and that said Letters Patent are hereby corrected as shown below:

Column 1, line 33, "seat" should read -- raceways --; line 60, cancel "either". Column 2, line 18, after "a" insert -- schematic --; line 42, "19" should read -- 17 --; line 53, after "39." insert -- By reversing the direction of the bearings, the direction of movement of the components is similarly reversed. --; line 58, "are" should read -- can be --; line 68, "56" should read -- 57 --. Column 3, line 22, "64" should read -- 65 --; line 36, "34" should read -- 32 --; line 40, "64" should read -- 62 --. Column 4, line 69, "mean" should read -- means --. Column 6, line 1, "3,404,133" should read -- 3,304,133 --.

Signed and sealed this 16th day of June 1970.

(SEAL)
Attest:

EDWARD M. FLETCHER, JR.                             WILLIAM E. SCHUYLER, JR.
Attesting Officer                                       Commissioner of Patents